United States Patent [19]
Hoole

[11] Patent Number: 5,977,658
[45] Date of Patent: Nov. 2, 1999

[54] VOLTAGE DOUBLING ALTERNATING CURRENT POWER SUPPLY

[76] Inventor: Duane W. Hoole, 613 W. Bob-o-Link La., Phoenix, Ariz. 85023

[21] Appl. No.: 09/148,577

[22] Filed: Sep. 4, 1998

Related U.S. Application Data

[60] Provisional application No. 60/058,453, Sep. 8, 1997.
[51] Int. Cl.$^6$ ..................................................... H02J 1/00
[52] U.S. Cl. .............................. 307/80; 307/19; 307/29; 307/72; 363/142; 363/143
[58] Field of Search ................................. 307/19, 29, 71, 307/72, 73, 77, 80, 85, 86, 87, 112, 116, 125, 127, 130, 131, 64, 65; 323/212, 213; 363/1, 59, 142, 143, 148

[56] References Cited

U.S. PATENT DOCUMENTS

| | | | |
|---|---|---|---|
| 4,052,657 | 10/1977 | Kleiner et al. | 363/43 |
| 4,780,805 | 10/1988 | Chewuk et al. | 363/142 |
| 4,837,672 | 6/1989 | Donze | 363/143 |
| 4,937,731 | 6/1990 | Konopka | 363/143 |
| 5,621,625 | 4/1997 | Bang | 363/21 |
| 5,666,278 | 9/1997 | Ng et al. | 363/71 |
| 5,796,595 | 8/1998 | Cross | 363/16 |

Primary Examiner—Jeffrey Gaffin
Assistant Examiner—Peter Zura
Attorney, Agent, or Firm—Richard E. Oney

[57] ABSTRACT

An alternating current power supply for providing a high-voltage alternating current power output from a first low-voltage alternating current power source and a second low-voltage alternating current power source is disclosed. A first alternating current low-voltage power input is coupled to the first low-voltage alternating current power source, and a second alternating current low-voltage power input is coupled to the second low-voltage alternating current power source. A switch simultaneously couples the first low-voltage power input to a first output conductor and the second low-voltage power input to a second output conductor, thereby providing a high-voltage power output between the output conductors. A switch control activates the switch responsive to a phase difference, typically 180 degrees, between the first alternating current power source and the second alternating current power source. The power supply can include a voltage adjustment element to cause the switch control to activate the switch when a voltage difference between the first low-voltage input means and the second low-voltage input exceeds a predetermined minimum voltage.

20 Claims, 3 Drawing Sheets

VOLTAGE DOUBLING ALTERNATING CURRENT POWER SUPPLY

BACKGROUND

This application claims the benefit of priority under 35 U.S.C. § 119(e) based upon commonly-owned U.S. provisional patent application Ser. No. 60/058453, filed Sep. 8, 1997, the contents of which are incorporated herein by express reference.

The present invention relates to power supplies and, more specifically, to an alternating current power supply for providing a high-voltage alternating current power output from a first low-voltage alternating current power source and a second low-voltage alternating current power source.

In the United States, most electrical receptacles in residences and other consumer facilities are 120-volt receptacles (also commonly referred to as 110 volt receptacles). Certain types of equipment, however, require 240-volt power for their operation. For example, larger power tools, pumps and air conditioners often require 240-volt power (also commonly referred to as 220 volt power). While 240-volt circuits and receptacles can be wired from the 240-volt distribution lines connected to the secondary winding of the distribution transformer, such circuits are installed only for specified, permanently installed equipment. They are not generally available for temporary or emergency use without the installation of new branch electrical circuits within the facility. It is often necessary or desirable to have 240-volt power even though a permanent 240-volt outlet is not available, such as during construction, for equipment evaluations, or for short-term manufacturing operations. To obtain access to 240-volt power in the absence of a permanent 240-volt outlet, one previously has had to install a new 240-volt circuit and outlet, which takes significant time and expense.

Accordingly, an object of my invention is to provide safe, convenient and quick connection to 240-volt line voltage distribution conductors through readily available, standard 120-volt receptacles, thereby accessing the full nominal 240 volts of the secondary winding of the distribution transformer.

A further object of my invention is to provide an apparatus and method by which one can use 240-volt equipment on a temporary or emergency basis where a 240-volt receptacle is not available, eliminating the time delay and expense of installing a new 240-volt circuit.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, I have provided an alternating current power supply for providing a high-voltage alternating current power output from a first low-voltage alternating current power source and a second low-voltage alternating current power source. The alternating current power supply includes a first input means for coupling to the first low-voltage alternating current power source; a second input means for coupling to the second low-voltage alternating current power source; output means for providing the high-voltage power output, the output means including a first output conductor and a second output conductor; switch means for simultaneously coupling the first input means to the first output conductor and the second input means to the second output conductor; and switch control means for activating the switch means responsive to a phase difference between the first alternating current power source and the second alternating current power source. Typically, the switch control means activates the switch means when the first low-voltage alternating current power source and the second low-voltage alternating current power source are substantially 180 degrees out of phase. The alternating current power supply can include optional adjustment means for causing the switch control means to activate the switch means when a voltage difference between the first input means and the second input means exceeds a predetermined minimum voltage.

Also according to my invention, an alternating current power supply can include a first alternating current power input; a second alternating current power input; an alternating current power output having a first output conductor and a second output conductor; and switch means for substantially simultaneously coupling the first input to the first output conductor and the second input to the second output conductor responsive to a phase difference between the first alternating current power source and the second alternating current power source. The switch means has a first control terminal coupled to the first alternating current power input, a second control terminal coupled to the second alternating current power input, a first input terminal coupled to the first alternating current power input, a second input terminal coupled to the second alternating current power input, a first output terminal, and a second output terminal. Optionally, the alternating current power supply can have adjustment means for causing the switch control means to activate the switch means when a voltage difference between the first input means and the second input means exceeds a predetermined minimum voltage.

Also in accordance with my invention, I have disclosed a method for providing a high-voltage alternating current power source from a first low-voltage alternating current power source and a second low-voltage alternating current power source. The method includes the steps of providing an alternating current power supply comprising a first power supply input, a second power supply input, and a power supply output having a first output conductor and a second output conductor, with the first output conductor and the second output conductor being isolated from the first power supply input and the second power supply input; coupling the first alternating current power source to the first power supply input; coupling the second alternating current power source to the second power supply input; and substantially simultaneously coupling the first power supply input to the first output conductor and the second power supply input to the second output conductor.

BRIEF DESCRIPTION OF THE DRAWINGS

The accompanying drawings, which are incorporated in and constitute a part of the specification, illustrate a presently preferred embodiment(s) and method(s) of the invention and, together with the general description given above and the detailed description of the preferred embodiment(s) and method(s) given below, serve to explain the principles of the invention.

DETAILED DESCRIPTION

Figure 1:
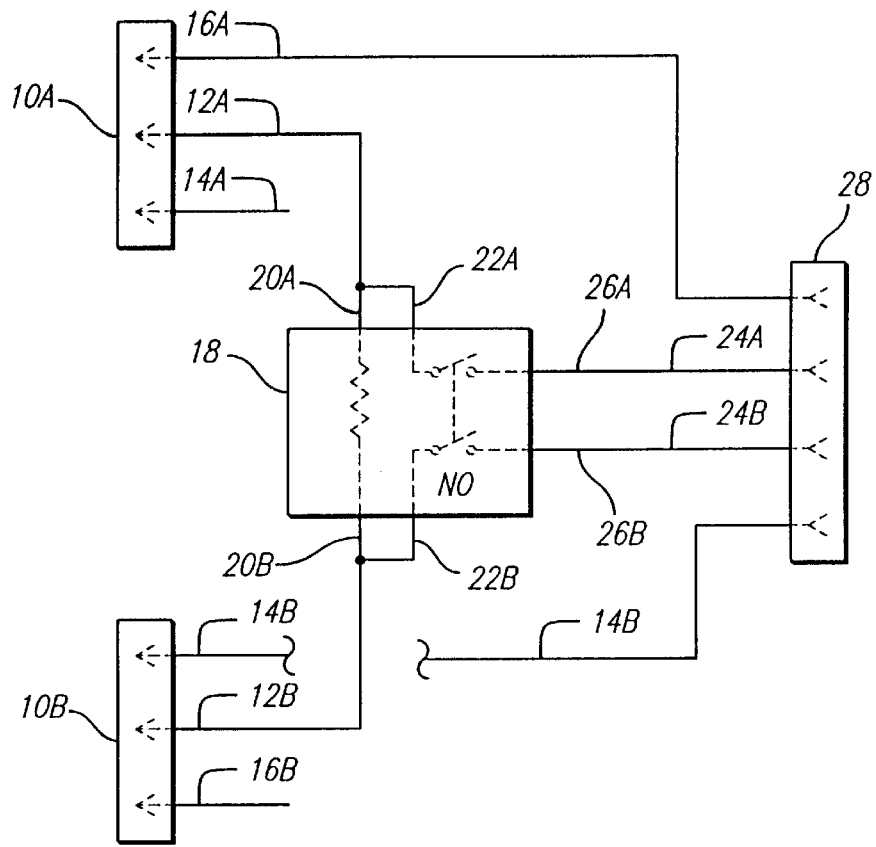
FIG. 1 shows a schematic diagram of an alternating current power supply in accordance with my invention.

Reference will now be made in detail to the presently preferred embodiment(s) and method(s) of the invention as illustrated in the accompanying drawings, in which like reference characters designate like or corresponding parts throughout the drawings.

FIG. 1 depicts an alternating current power supply in accordance with my invention. A first lower voltage input means includes a standard 120-volt AC male three prong electrical plug 10A used for commercial or residential appliances. The first input plug 10A is connected to a first three-wire cable having a first line voltage conductor 12A, a first common conductor 14A, and a first grounding conductor 16A. Similarly, a second 120-volt AC male input plug 10B is connected to a second three-wire cable having a second line voltage conductor 12B, a second common conductor 14B, and a second grounding conductor 16B. The first line voltage conductor 12A is connected to a double-pole electrically controlled switching device 18 at a first control terminal 20A and at a first power input terminal 22A. Similarly, the second line voltage conductor 12B is connected to the switching device 18 at a second control terminal 20B and at a second power input terminal 22B.

Still referring to FIG. 1, a first power output terminal 26A of the device 18 is connected by a first output conductor 24A to an input terminal of an electrical load (not shown) or to an optional output receptacle 28. A second power output terminal 26B of the switching device 18 is connected by a second output conductor 24B to a second input terminal of the electrical load (not shown) or to the output receptacle 28. Electrical grounding is supplied by connecting either a first grounding conductor 16A or a second grounding conductor 16B (which are connected to input plugs 10A and 10B, respectively) to output receptacle 28. For safety reasons, it is preferable that only one of the grounding conductors 16A or 16B be connected to the output receptacle 28. If a common conductor is required for the electrical load, one, but not both, of the common conductors 14A and 14B (which are connected at one end to input plugs 10A and 10B, respectively) is connected to an appropriate terminal of the electrical load (not shown) or optional output receptacle 28.

Figure 2:
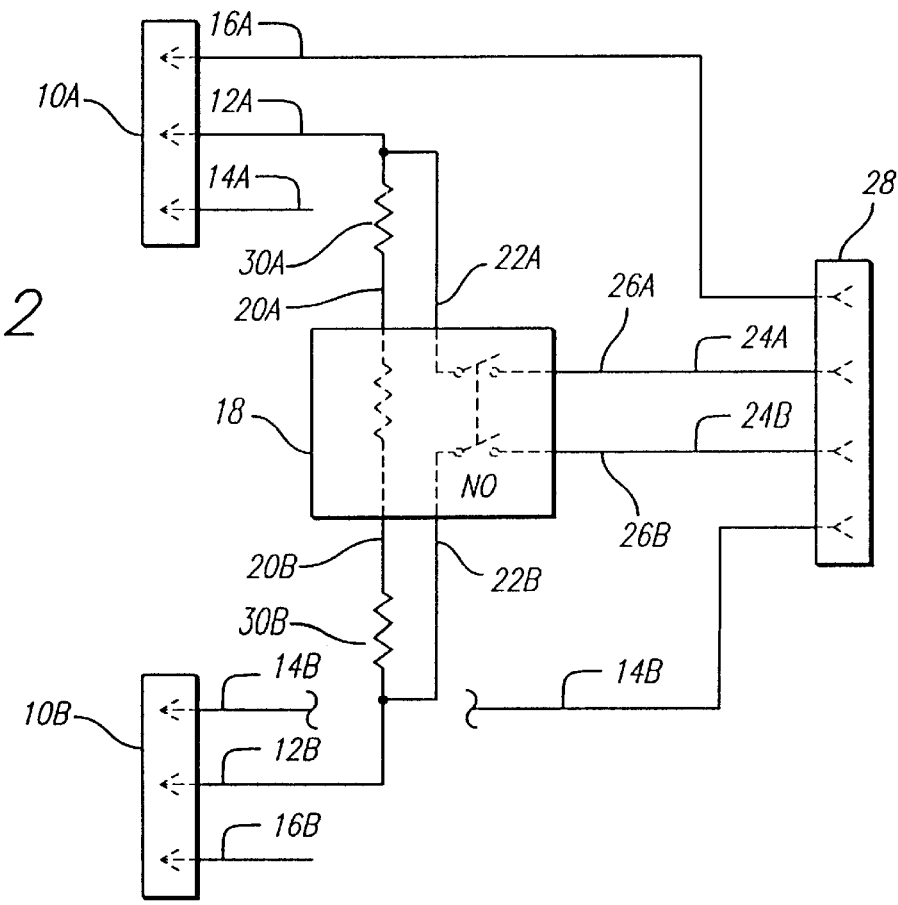
FIG. 2 shows a schematic diagram of an alternating current power supply in accordance with my invention, including voltage control elements 30A and 30B for adjusting the activation voltage at which the switching device 18 activates and deactivates.

FIG. 2 depicts an alternating current power supply in accordance with my invention that includes means for adjusting the activation voltage at which the double-pole electrically controlled switching device 18 activates and deactivates. A first voltage control element 30A is placed between the first line voltage conductor 12A and the first control terminal 20A. A second voltage control element 30B is placed between the second line voltage conductor 12B and the second control terminal 20B. In this configuration the user avoids activating the switch device 18 when one of the first or second input voltage conductors 12A, 12B is inadvertently connected through input plugs 10A or 10B to a ground or common conductor in a miswired receptacle. When such a miswiring exists, only 120 volts will be produced between the first and second output conductors 24A and 24B, which can potentially damage equipment designed to operate on a nominal 240-volt input. The voltage control elements 30A and 30B can be resistors, diodes or any other circuitry for controlling the voltage or current at the control terminals 20A and 20B in response to the voltage on the line voltage conductors 12A and 12B. The voltage control elements 30A and 30B need not be identical.

Figure 3:
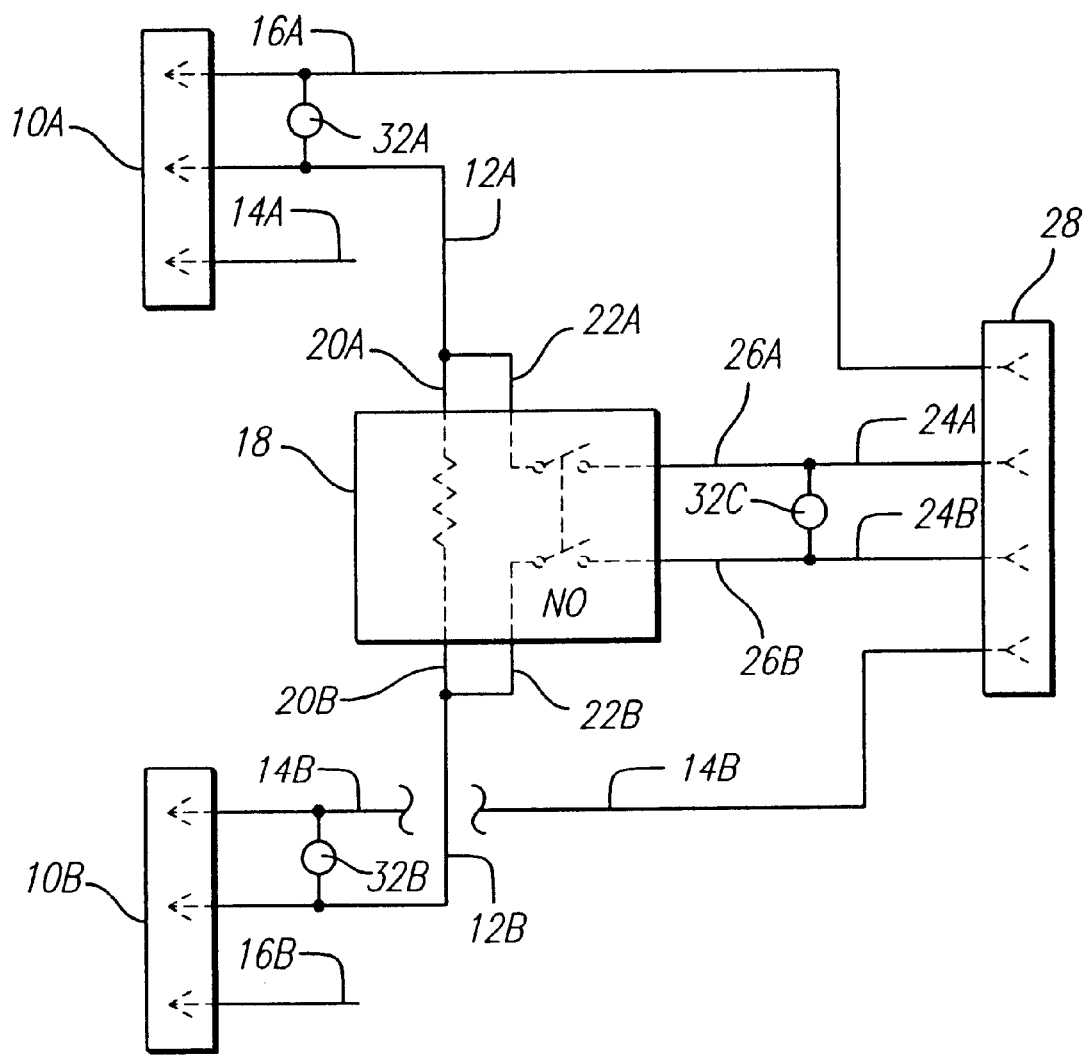
FIG. 3 shows a schematic diagram of an alternating current power supply in accordance with my invention, including monitors 32 to monitor the appropriate operation and installation of the power supply.

FIG. 3 depicts an alternating current power supply in accordance with my invention that includes system monitors 32 at key points to monitor the appropriate operation and installation of the invention. The system monitors 32 may be as simple as indicator lamps, or they may be more complex electrical measurement devices for measuring the presence of a voltage, such as a voltmeter or system failure alarm. A first monitor 32A is coupled between the first line voltage conductor 12A and the first grounding conductor 16A and monitors the presence of the 120-volt input and the earth ground at the first input plug 10A. A second monitor 32B is coupled between the second line voltage conductor 12B and the second common conductor 14B. The second monitor 32B monitors the presence of the 120-volt input and the common connection at the second input plug 10B. When all inputs are connected to 120-volt AC input sources, each of the monitors 32A and 32B will detect an input voltage. Furthermore, if the input plugs 10A and 10B are swapped between their respective source receptacles and the monitors 32A and 32B still detect input voltage, then one can conclude that the input power receptacles are wired correctly. An output monitor 32C, located between output conductor 24A and output conductor 24B, confirms that power is available for the output receptacle 28, if used, or for the electrical load.

Figure 4:
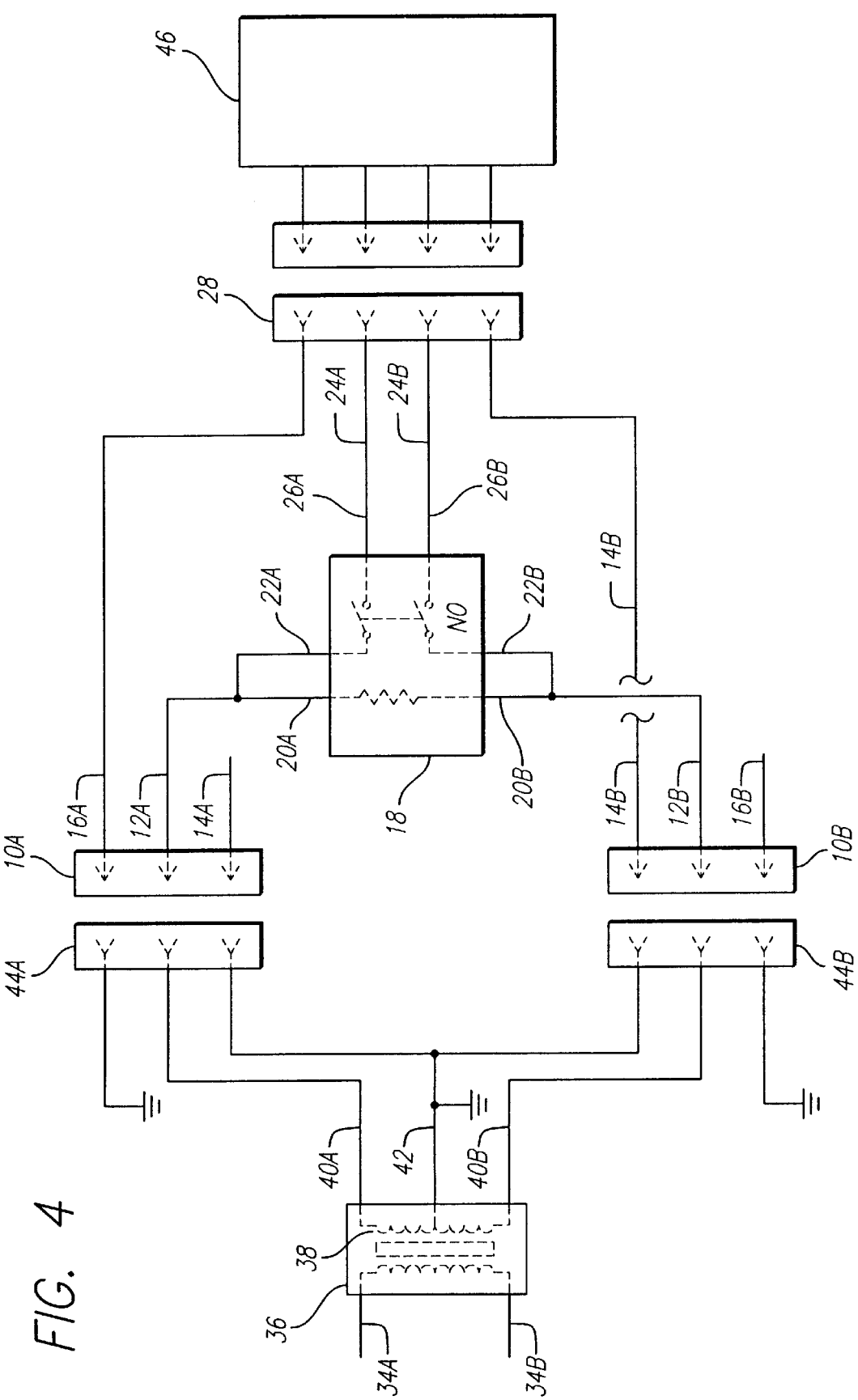
FIG. 4 shows a schematic diagram of the alternating current power supply of FIG. 1 connected to typical first and second low-voltage alternating current electrical power sources and to a typical high-voltage load.

FIG. 4 depicts an alternating current power supply in accordance with my invention connected to a typical alternating current electrical power source and typical load. In typical power systems, electrical power is distributed from the generating source (not shown) by means of high voltage transmission lines 34A, 34B. The voltage of the electrical power is reduced to a level suitable for consumer use with a distribution transformer 36. The full output voltage of the distribution transformer 36 is developed across the electrical ends of secondary winding 38 and is accessed through connections to a first line voltage distribution conductor 40A and to a second line voltage distribution conductor 40B, as shown.

A power supply according to my invention will operate with single phase, alternating current electrical power as typically supplied by a public utility or a source with similar electrical characteristics. For purposes of describing my invention and its operation, the full secondary output of transformer 38 is nominally referred to as 240 volts. It will be understood, however, that the full output voltage of distribution transformer 36 may vary and may fall within a broad range due to system design and electrical load variations.

The distribution transformer 36 typically also has a connection to a common distribution conductor 42 at the electrical center of the secondary winding 38. Voltage developed on the secondary winding 38 between the first line voltage distribution conductor 40A and the electrical center of the secondary winding 38 is one half the full voltage of the secondary winding 38, nominally 120 volts. Likewise, voltage developed on the secondary winding 38 between the second line voltage distribution conductor 40B and the electrical center of the secondary winding 38 is also one half the full voltage of the secondary winding 38, nominally 120 volts. Thus, from the secondary winding 38 there are three possible output connections for electrical power: (1) the first line voltage distribution conductor 40A and the second line voltage distribution conductor 40B, for 240 volts, (2) the first line voltage distribution conductor 40A and the common distribution conductor 42, for 120 volts, and (3) the second line voltage distribution conductor 40B and the common distribution conductor 42, for 120 volts. Although combinations (2) and (3) both produce 120 volts, their alternating current phase will differ by 180 degrees.

Still referring to FIG. 4, most electrical receptacles in residences and other consumer facilities are 120-volt receptacles. Such receptacles are connected to either first line voltage distribution conductor 40A or 40B and to the common distribution conductor 42. Receptacles wired for 240 volt power from the line voltage distribution conductors 40A and 40B typically are placed only for specified, permanently installed equipment and are not generally available to temporary or emergency use without the installation of new branch electrical circuits within the facility. In accordance with my invention, the person desiring to use equipment requiring 240 volts connects the first input plug 10A to any 120-volt receptacle, such as the first 120-volt receptacle 44A. Next, the user connects the second input plug 10B to another 120-volt receptacle in the area. If that receptacle is wired to the second line voltage distribution conductor 40B, such as the second receptacle 44B, the voltage between line voltage conductors 12A and 12B will be the full 240 volts supplied by secondary winding 38 of distribution transformer 36. The 240 volts is thus supplied to control terminals 20A and 20B of the switching device 18, closing both poles of the switching device. Electrical power is then conducted through the first line voltage conductor 12A, the first power input terminal 22A, one pole of said switching device 18, the first power output terminal 26A, the first output conductor 24A, the optional output receptacle 28, and to the electrical load 46. Concurrently, the other side of the electrical connection is completed through the second line voltage conductor 12B, power input terminal 22B, the second pole of said switching device 18, power output terminal 26B, output conductor 24B, optional output receptacle 28, and to the electrical load 46.

If, the user proceeds as in the previous paragraph, but connects the second input plug 10B to another 120-volt receptacle (not shown) that is wired to the same end of secondary winding 38 of distribution transformer 36 as is first receptacle 44A, the resulting voltage between line voltage conductors 12A and 12B and, hence, control terminals 20A and 20B will be zero. The switching device 18 will not close, and the line voltage conductors 12A and 12B will remain electrically isolated from output conductors 24A and 24B. Similarly, if there is line voltage on either of conductor 24A or 24B, but not on the other, switching device 18 will not close, and the line voltage 12A and 12B will remain electrically isolated from output conductors 24A and 24B. This isolation is a desirable feature of the invention: power is isolated from the output receptacle 28 and the electrical load 46 until input plugs 10A and 10B are properly connected to appropriate 120-volt conductors which are 180 degrees out of phase, producing the desired 240-volt output. This eliminates potential equipment damage or electrical shock to the user, which may happen if either output conductor 24A or 24B is electrically connected to power and the other is not.

If the user encounters the situation described in the previous paragraph, i.e., the switching device 18 has not closed and no power is being supplied to either the output receptacle 28 or the electrical load 46, the user simply unplugs the first input plug 10A from the receptacle, and plugs it into another receptacle. When the correct connection is achieved, i.e. when a receptacle connected to the first distribution conductor 40A is found, such as receptacle 44A, the switching device 18 closes and power is supplied to the output receptacle 28 and/or the electrical load 46. In practice, this is a relatively easy procedure because receptacles connected to each end of the secondary winding 38 of the distributor transformer 36 both are generally available in a single facility and are in close proximity to each other.

The above-described embodiments and methods possess several advantages. Specifically, they provide safe, convenient and quick connection to line voltage distribution conductors 40A and 40B through readily available, standard 120-volt receptacles 44A and 44B, thereby accessing the full nominal 240 volts of secondary winding 38. The embodiments also permit users to use 240 volt equipment on a temporary or emergency basis where 240 volt receptacles are not available, eliminating the time delay and expense of installing a new 240 volt circuit.

Additional advantages and modifications will readily occur to those skilled in the art. For example, although the invention has been discussed above in connection with 120-volt input voltages and a 240-volt output voltage, it can be used with any power distribution system that utilizes a distribution transformer with a center tap common conductor. As another example, a power supply in accordance with my invention could be incorporated into various devices, such as power tools, pumps, and test equipment, that require 240-volt power. Also, alarm circuitry may be added to provide a visible or audible alarm upon the interruption of power or a drop in the supply voltage. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An alternating current power supply for providing a high-voltage alternating current power output from a first low-voltage alternating current power source and a second low-voltage alternating current power source, the alternating current power supply comprising:

a first input means for coupling to the first low-voltage alternating current power source;

a second input means for coupling to the second low-voltage alternating current power source;

output means for providing the high-voltage power output, the output means comprising a first output conductor and a second output conductor;

switch means for simultaneously coupling the first input means to the first output conductor and the second input means to the second output conductor; and switch control means for activating the switch means responsive to a phase difference between the first alternating current power source and the second alternating current power source.

2. The alternating current power supply of claim 1 wherein the switch control means activates the switch means when the first low-voltage alternating current power source and the second low-voltage alternating current power source are substantially 180 degrees out of phase.

3. The alternating current power supply of claim 1 further comprising adjustment means for causing the switch control means to activate the switch means when a voltage difference between the first input means and the second input means exceeds a predetermined minimum voltage.

4. The alternating current power supply of claim 1 wherein the switch means comprises an electrically controlled double-pole switch.

5. The alternating current power supply of claim 1 further comprising a first input monitoring means for monitoring a power signal and a grounding conductor at the first input means.

6. The alternating current power supply of claim 1 further comprising a second input monitoring means for monitoring a power signal and a common conductor at the second input means.

7. The alternating current power supply of claim 1 further comprising an output monitoring means for monitoring a power signal at the output means.

8. An alternating current power supply for providing a high-voltage alternating current power output from a first low-voltage alternating current power source and a second low-voltage alternating current power source, the alternating current power supply comprising:

a first alternating current power input;

a second alternating current power input;

an alternating current power output having a first output conductor and a second output conductor; and switch means for substantially simultaneously coupling the first input to the first output conductor and the second input to the second output conductor responsive to a phase difference between the first alternating current power source and the second alternating current power source, the switch means having a first control terminal coupled to the first alternating current power input, a second control terminal coupled to the second alternating control power input, a first input terminal coupled to the first alternating current power input, a second input terminal coupled to the second alternating control power input, a first output terminal and a second output terminal.

9. The alternating current power supply of claim 8 further comprising adjustment means for causing the switch control means to activate the switch means when the voltage difference between the first input means and the second input means exceeds a predetermined minimum voltage.

10. The alternating current power supply of claim 9 wherein the adjustment means comprises electrical resistance coupled between the first alternating current power input and the switch means first control terminal.

11. The alternating current power supply of claim 9 wherein the adjustment means comprises electrical resistance coupled between the second alternating current power input and the switch means second control terminal.

12. The alternating current power supply of claim 8 wherein the switch means comprises an electrically controlled double-pole switch.

13. The alternating current power supply of claim 8 further comprising a first input monitoring means for monitoring a power signal at the first alternating current power input.

14. The alternating current power supply of claim 8 further comprising a second input monitoring means for monitoring a power signal at the second alternating current power input.

15. The alternating current power supply of claim 8 further comprising monitoring means for monitoring a power signal at the high-voltage output.

16. A method for providing a high-voltage alternating current power source from a first low-voltage alternating current power source and a second low-voltage alternating current power source, the method comprising the steps of:

providing an alternating current power supply comprising a first power supply input, a second power supply input, and a power supply output having a first output conductor and a second output conductor, the first output conductor and the second output conductor being isolated from the first power supply input and the second power supply input;

coupling the first alternating current power source to the first power supply input;

coupling the second alternating current power source to the second power supply input; and substantially simultaneously coupling the first power supply input to the first output conductor and the second power supply input to the second output conductor.

17. The method for providing a high-voltage alternating current power source of claim 16 wherein the step of substantially simultaneously coupling the first power supply input to the first output conductor and the second power supply input to the second output conductor comprises:

providing a switch having a first control terminal coupled to the first power supply input, a second control terminal coupled to the second power supply input, a first input terminal coupled to the first power supply input, a second input terminal coupled to the second power supply input, a first output terminal coupled to the first output conductor and a second output terminal coupled to the second output conductor; and activating the switch to simultaneously couple the first power supply input to the first output conductor and the second power supply input to the second output conductor.

18. The method for providing a high-voltage alternating current power source of claim 17 wherein the step of providing the switch comprises providing a double-pole switch.

19. The method for providing a high-voltage alternating current power source of claim 17 wherein the step of activating the switch comprises activating the switch when the first low-voltage alternating current power source and the second low-voltage alternating current power source are substantially 180 degrees out of phase.

20. The method for providing a high-voltage alternating current power source of claim 17 wherein the step of activating the switch comprises activating the switch when a voltage difference between the first input means and the second input means exceeds a predetermined minimum voltage.

* * * * *